US012562508B2

(12) United States Patent
Dossmann et al.

(10) Patent No.: US 12,562,508 B2
(45) Date of Patent: Feb. 24, 2026

(54) INSULATION-PIERCING CONNECTOR

(71) Applicant: Tyco Electronics—Simel, Gevrey-Chambertin (FR)

(72) Inventors: Julien Dossmann, Gevrey-Chambertin (FR); Bruno Peltier, Gevrey-Chambertin (FR); Alexandre Guichard, Gevrey-Chambertin (FR)

(73) Assignee: TYCO ELECTRONICS—SIMEL, Gevrey-Chambertin (FR)

( * ) Notice: Subject to any disclaimer, the term of this patent is extended or adjusted under 35 U.S.C. 154(b) by 678 days.

(21) Appl. No.: 17/940,381

(22) Filed: Sep. 8, 2022

(65) Prior Publication Data

US 2023/0231329 A1 Jul. 20, 2023

(30) Foreign Application Priority Data

Sep. 8, 2021 (EP) .................................... 21306228

(51) Int. Cl.
*H01R 4/2408* (2018.01)
*H01R 4/40* (2006.01)
*H01R 4/44* (2006.01)

(52) U.S. Cl.
CPC ............ *H01R 4/2408* (2013.01); *H01R 4/40* (2013.01); *H01R 4/44* (2013.01)

(58) Field of Classification Search
CPC .. H01R 4/2408; H01R 4/2404; H01R 4/2407; H01R 4/2412; H01R 4/24; H01R 4/2416; H01R 4/40; H01R 4/44
See application file for complete search history.

(56) References Cited

U.S. PATENT DOCUMENTS

| | | | | |
|---|---|---|---|---|
| 8,678,852 | B2 | 3/2014 | Rineau et al. | |
| 11,177,585 | B2 * | 11/2021 | Arflack | G01R 19/0084 |
| 2019/0140368 | A1 | 5/2019 | Martin | |

FOREIGN PATENT DOCUMENTS

| | | | |
|---|---|---|---|
| EP | 1139496 | A2 | 10/2001 |
| EP | 2541684 | A1 | 6/2012 |
| EP | 2882040 | A1 | 12/2013 |

(Continued)

OTHER PUBLICATIONS

FR 3017494 Machine Translation.*
Extended European Search Report, Application No. 21306228.4-1201, Dated: Mar. 16, 2022, 12 pages.

*Primary Examiner* — Renee S Luebke
*Assistant Examiner* — Paul D Baillargeon

(57) ABSTRACT

A cable connector assembly includes a pair of sub-assemblies movable in translation relative to each other along a clamping direction and a tightening device tightening the sub-assemblies along the clamping direction. Each of the sub-assemblies is pivotable relative to a pivot axis extending perpendicular to the clamping direction. Each of the sub-assemblies has a main housing and a clamping part at least partially housed within the main housing. The clamping part is movable in translation relative to the main housing along the clamping direction. The tightening device tightens the sub-assemblies along the clamping direction with a first clamping region formed between the sub-assemblies that receives and clamps a first cable. A secondary clamping region is formed in each of the sub-assemblies between the clamping part and the main housing that receives and clamps a secondary cable.

18 Claims, 4 Drawing Sheets

(56) References Cited

FOREIGN PATENT DOCUMENTS

| | | | | |
|---|---|---|---|---|
| EP | 2871720 A1 * | 5/2015 | ............. | H01R 9/031 |
| EP | 3836304 A1 | 6/2020 | | |
| FR | 2930847 A1 | 11/2009 | | |
| FR | 3017494 A1 | 8/2015 | | |

* cited by examiner

INSULATION-PIERCING CONNECTOR

CROSS-REFERENCE TO RELATED APPLICATIONS

This application claims the benefit of the filing date under 35 U.S.C. § 119(a)-(d) of European Patent Application No. 21306228.4, filed on Sep. 8, 2021.

FIELD OF THE INVENTION

The present invention relates to a cable connector assembly for electrically connecting cables, in particular for electrically connecting a first insulated cable to a plurality of secondary insulated cables.

BACKGROUND

Photovoltaic power stations, like solar farms or solar parks, consist of a large collection of photovoltaic solar panels that absorb solar energy, convert it into electricity and provide that electricity to the power grid for distribution. Traditionally, multiple individual combiner box connections are used for collecting the electricity produced by each panel.

It is generally preferred to use a trunk-bus architecture in photovoltaic power stations, to provide less complex wiring arrangements compared to the traditional approach. The main issue with the trunk-bus architecture is collecting numerous tap cables, feeding electrical power to distribution line conductors, to one main truck cable, i.e. a main power transmission conductor. A conventional trunk-bus architecture approach for collecting the electricity produced by each panel is to use one insulation-piercing connector per connection. Insulation-piercing connectors are already commonly used for insulated aerial bundled cables. Typically, these insulated aerial bundled cables comprise an outer insulation layer surrounding a bundle of electrical conductors.

Insulation-piercing connectors are known in the art, like from EP 1 139 496 A2, for connecting two insulated aerial bundled cables, for instance when tapping a main line with a branch line or with another main line. Such known connectors comprise two clamping halves designed to clamp two insulated aerial bundled cables arranged therebetween parallel to one another by tightening device. In order to connect the respective bundles of electrical conductors of the two clamped insulated aerial bundled cables, it is known that each clamping half usually comprises two parallel long insulation-piercing blades that extend along a transversal direction of the connector and serve as a tightening device. In turn, these insulation-piercing blades comprise teeth protruding from their two extremities perpendicularly to the transversal direction. Thus, depending on the type of insulation-piercing connector, two, four or up to eight long insulation-piercing blades are used for piercing the insulation layers of the two insulated aerial bundled cables sandwiched therebetween, from above and from below simultaneously, and thereby electrically connect the respective bundles of electrical conductors.

However, the insulation-piercing connector known from EP 1 139 496 A2 is configured for clamping insulated aerial bundled cables of same diameters. Such connectors are thus not adapted for connecting insulated aerial bundled cables of different diameters, as these would cause an asymmetry in the connector.

The insulation-piercing connector known from FR 2930847 A1 comprises pivotable clamping parts with respect to a clamping direction of the connector allowing to clamp insulated cables of different diameters therebetween. Each insulation-piercing connector known from FR 2930847 A1 is, however, built such that it can only clamp up to four insulated cables. In order to clamp more than four insulated cables, FR 2930847 A1 propose to mechanically join two identical insulation-piercing connectors, by an assembly means, like a wedge gear element.

There is, however, a need to decrease the number of insulation-piercing connectors on the photovoltaic power stations, for reducing the installation cost and the space required for the electrical connections.

SUMMARY

A cable connector assembly includes a pair of sub-assemblies movable in translation relative to each other along a clamping direction and a tightening device tightening the sub-assemblies along the clamping direction. Each of the sub-assemblies is pivotable relative to a pivot axis extending perpendicular to the clamping direction. Each of the sub-assemblies has a main housing and a clamping part at least partially housed within the main housing. The clamping part is movable in translation relative to the main housing along the clamping direction. The tightening device tightens the sub-assemblies along the clamping direction with a first clamping region formed between the sub-assemblies that receives and clamps a first cable. A secondary clamping region is formed in each of the sub-assemblies between the clamping part and the main housing that receives and clamps a secondary cable.

BRIEF DESCRIPTION OF THE DRAWINGS

The invention will now be described by way of example with reference to the accompanying Figures, of which.

DETAILED DESCRIPTION OF THE EMBODIMENT(S)

Features and advantages of the present invention will be described with reference to the drawings. In the description, reference is made to the accompanying figures that are meant to illustrate embodiments of the invention. It is understood that such embodiments do not represent the full scope of the invention.

Figure 1:
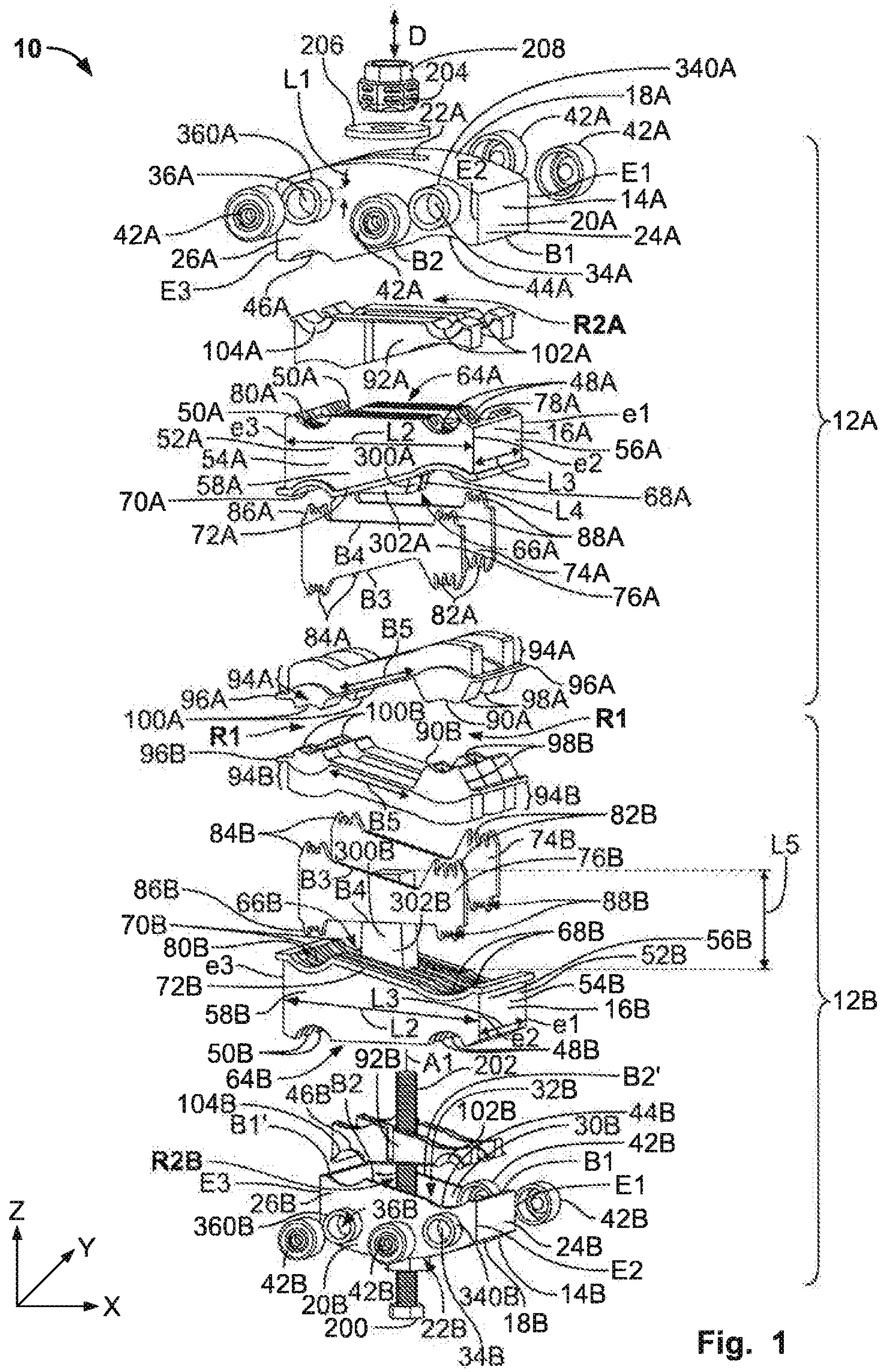
FIG. 1 is an exploded perspective view of a cable connector assembly according to an embodiment.
Figure 2:
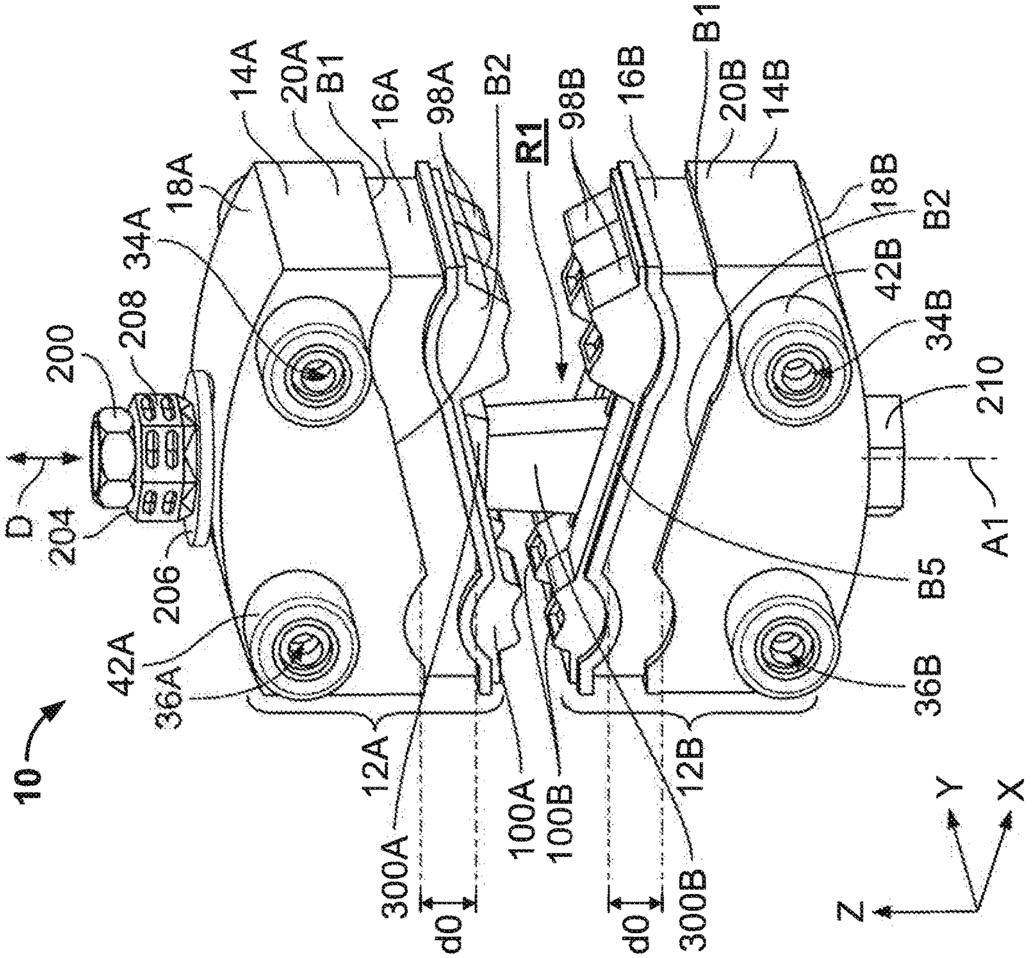
FIG. 2 is a perspective view of the cable connector assembly in an assembled state without any insulated conductor cables.

FIGS. 1 and 2 schematically illustrate a cable connector assembly 10 according to an exemplary embodiment the invention. FIG. 1 illustrates the cable connector assembly 10 in an exploded view, while FIG. 2 illustrates the cable connector assembly 10 in an assembled state.

The cable connector assembly 10 is an insulation-piercing connector 10 for electrically connecting cables, in particular for electrically connecting a first insulated cable to a plurality of secondary insulated cables, more in particular for electrically connecting a first insulated cable having a greater diameter than the respective diameter of secondary insulated cables.

As illustrated in FIGS. 1 and 2, the cable connector assembly 10 comprises two sub-assemblies 12A, 12B arranged one above the other along a clamping direction D of the cable connector assembly 10. The clamping direction D is represented by a double arrow "D" parallel to a Z-axis of the Cartesian coordinate system indicated in FIGS. 1 and 2.

In the following, the reference signs comprising the letter "A" refers to the first sub-assembly 12A corresponding to the upper sub-assembly 12A illustrated in FIGS. 1 and 2. The reference signs comprising the letter "B" refers to the second sub-assembly 12B corresponding to the lower sub-assembly 12B illustrated in FIGS. 1 and 2.

The first sub-assembly 12A is substantially symmetrical to the second sub-assembly 12B by mirror symmetry, also called reflection symmetry, with respect to a plane of symmetry (XY) of the Cartesian coordinate system perpendicular to the clamping direction D, as indicated in FIGS. 1 and 2.

Each sub-assembly 12A, 12B comprises a respective main housing 14A, 14B and a respective clamping part 16A, 16B.

In an embodiment, each of the main housings 14A, 14B and each of the clamping parts 16A, 16B are respectively integrally formed in one-piece in a non-electrically conductive material. For instance, each of the main housings 14A, 14B and each of the clamping parts 16A, 16B are respectively formed by plastic injection molding. Hence, the cable connector assembly 10 comprises four distinct plastic components 14A, 14B, 16A, 16B.

Each main housing 14A, 14B comprises a base 18A, 18B from which extends a circumferential wall 20A, 20B along the clamping direction D. Each base 18A, 18B is provided with a through-hole 22A, 22B. In the exemplary embodiments of FIGS. 1 and 2, the through-holes 22A, 22B are oblong. Moreover, in the exemplary embodiments of FIGS. 1 and 2, the bases 18A, 18B are convex surfaces. As further explained below, the combination of the oblong shape of the through holes 22A, 22B and the convex surfaces of the bases 18A, 18B makes it easier to pivot the sub-assemblies 12A, 12B relative to a respective pivot axis parallel to the Y-axis of the Cartesian coordinate system indicated in FIGS. 1 and 2. Accordingly, the respective pivot axis of the sub-assemblies 12A, 12B is perpendicular to the clamping direction D. In other embodiments, the through-holes 22A, 22B can have a circular shape and/or the bases 18A, 18B can be flat surfaces in a plane (XY) of the Cartesian coordinate system indicated in FIGS. 1 and 2.

In the exemplary embodiments of FIGS. 1 and 2, each base 18A, 18B is a four-sided base. Consequently, each circumferential wall 20A, 20B is provided with four faces 24A-B, 26A-B, 28A-B, 30A-B (only faces 24A-B, 26A-B, 28B, 30B are visible in the view of FIG. 1).

Each face 24A, 26A, 28A, 30A (respectively each face 24B, 26B, 28B, 30B) ends with a respective free-border B1, B1', B2, B2'. As better shown in the second-assembly 12B of FIG. 1, the free-borders B1, B1' respectively longitudinally extend along the Y-axis of the Cartesian coordinate system indicated in FIG. 1. Hence, the free-borders B1, B1' are parallel to each other. The free-borders B2, B2' respectively extend perpendicularly from the free-borders B1, B1' along the X-axis of the Cartesian coordinate system indicated in FIG. 1. The free-borders B2, B2' are parallel to each other.

In the main housing 14A (respectively the main housing 14B), adjacent faces 24A, 26A, 28A, 30A (respectively adjacent faces 24B, 26B, 28B, 30B) are joined to one another by edges E1, E2, E3, E4 (E4 is not visible in the view of FIG. 1). The edge E1 joins the faces 24A and 30A (respectively 24B and 30B). The edge E2 joins the faces 24A and 26A (respectively 24B and 26B). The edge E3 joins the faces 26A and 28A (respectively 26B and 28B). The edge E4 (not visible in the view of FIG. 1) joins the faces 28A and 30A (respectively 28B and 30B). In one embodiment of the present invention, the edges E1, E2, E3, E4 can have the same length.

In the exemplary embodiment shown in FIG. 1, two edges E1, E2 are shorter than the two other edges E3, E4. The edge E1 has the same length than the edge E2. The edge E3 has the same length as the edge E4. Hence, two opposites faces 28A and 30A (respectively 28B and 30B) of the circumferential wall 20A (respectively 20B) are each respectively provided with edges of different lengths. Consequently, because of the length difference of the edges, the free borders B2, B2' are oblique edges, in particular with respect to the plan (XY). The oblique geometry of the free borders B2, B2' is defined by the entire free border B2 not being perpendicular to the edges E2, E3 and the entire free border B2' not being perpendicular to the edges E1, E4. It is noted that in the exemplary embodiment shown in FIG. 1, the free border B1 is perpendicular to the edges E1, E4 and the free border B1' is perpendicular to the edges E2, E3.

Each circumferential wall 20A, 20B, respectively consisting of the four faces 24A-B, 26A-B, 28A-B, 30A-B as mentioned above, defines a housing cavity 32A, 32B (only the housing cavity 32B is visible in the view of FIG. 1). The respective surface of the faces 24A-B, 26A-B, 28A-B, 30A-B oriented towards the housing cavity 32A, 32B, i.e. to an inside of the sub-assembly 16A, 16B, is mentioned hereafter as "internal surfaces".

As further described thereafter, each housing cavity 32A, 32B is configured for receiving in translation the clamping part 16A, 16B and up to four cables (the cables are not represented in FIGS. 1 and 2). In order to be able to insert cables into the housing cavity 32A, 32B, the circumferential wall 20A, 20B is provided with at least one through-hole sized to the dimensions of a cable.

For sake of clarity in the description of the figures, reference is made in the following to the sub-assembly 12A only. It is noted that the description sub-assembly 12A, by the mirror symmetry, also applies to the sub-assembly 12B, wherein the letter "A" following the reference signs is to be replaced by the letter "B".

In the exemplary embodiment shown in FIG. 1, two opposite faces 26A, 30A are respectively provided with two circular through-holes each. The face 26A comprises two circular through-holes 34A, 36A. A central axis of each through-hole 34A, 36A is parallel to the Y-axis of the Cartesian coordinate system indicated in FIG. 1. Said central axis of the through-holes 34A, 36A are respectively aligned with central axis of two further circular through-holes 38A, 40A (not visible in the view of FIG. 1) provided on the opposite face 30A of the face 26A. Hence, a cable can be inserted via the through-hole 34A and lead out by the opposite through hole 40A. Respectively, a cable can be inserted via the through-hole 36A and lead out by the opposite through hole 38A.

In a variant wherein four cables are placed in the housing cavity 32A, as later explained in reference to FIG. 3, each of the four cables can be respectively inserted in a through-hole 34A, 36A, 38A, 40A and does not exit from the housing cavity 32A.

In the exemplary embodiment shown in FIG. 1, each through-hole 34A, 36A, 38A, 40A is provided by a respective circular rim 340A, 360A, 380A, 400A (only the circular rims 340A, 360A are visible in FIG. 1) perpendicularly extending along a length L1 from the faces 26A, 30A of the circumferential wall 20A. The circular rims 340A, 360A, 380A, 400A provide a mechanical support to a cable inserted into a respective through-hole 34A, 36A, 38A, 40A.

The circular rims 340A, 360A, 380A, 400A also serve for mounting a sealing device 42A on the respective through-hole 34A, 36A, 38A, 40A so as to seal an interface between the housing cavity 32A and a cable inserted into one of the through holes 34A, 36A, 38A, 40A. In the exemplary embodiment shown in FIG. 1, each sealing device 42A is made of an elastomer material and has an essentially cylindrical shape of a length substantially equal to the length L1.

In a non-watertight variant of the cable connector assembly 10, the main housing 14A is not provided with sealing device 42A. Hence, in the non-watertight variant, the circular rims 340A, 360A, 380A, 400A can be optional.

As further shown in FIG. 1, the free-border B2 of the face 26A (respectively the free-border B2' of the face 30A) is provided with two concave recesses 44A, 46A. The recesses 44A, 46A respectively have a depth extending along the Z-axis.

In the following, the clamping part 16A is further described with respect to FIGS. 1 and 2. As mentioned above, for sake of clarity in the description of the figures, reference is made to the sub-assembly 12A only. It is noted that the description of the sub-assembly 12A also applies to the sub-assembly 12B, wherein the letter "A" following the reference signs is to be replaced by the letter "B". The clamping part 16A comprises a housing 52A delimited by a circumferential wall 54A.

In order to be insertable in the housing cavity 32A of the main housing 14A, the housing 52A of the clamping part 16A has a complementary shape of the housing cavity 32A of the main housing 14A. As a result, like the circumferential wall 20A, the circumferential wall 54A of the clamping part 16A is provided with four faces 56A, 58A, 60A, 62A (only the faces 56A, 58A are visible in FIG. 1) extending along the clamping direction D.

A length L2 (as indicated by a double arrow L2 in FIG. 1) of the opposite faces 58A, 60A is parallel to the X-axis of the Cartesian coordinate system indicated in FIG. 1. A length L3 (as indicated by a double arrow L3 in FIG. 1) of the opposite faces 56A, 62A is parallel to the Y-axis of the Cartesian coordinate system indicated in FIG. 1. The lengths L2 and L3 as defined above are respectively adapted to the internal dimensions (not visible in FIG. 1) of the housing cavity 32A. In particular, the lengths L2 and L3 are determined such that the faces 56A, 58A, 60A, 62A of the clamping part 16A respectively slide along the faces 24A, 26A, 28A, 30A of the housing cavity 32A of the main housing 14A along the clamping direction D.

The selection of the lengths L2 and L3 is made so as to avoid an excess of friction between the faces 56A, 58A, 60A, 62A of the clamping part 16A and the faces 24A, 26A, 28A, 30A of the housing cavity 32A of the main housing 14A for allowing a translation motion between the main housing 14A for and the clamping part 16A without too much resistance for an installer.

It is understood that the faces of the main housing 14A along which the faces of the clamping part 16A translate, correspond to the internal surfaces of the faces 24A, 26A, 28A, 30A of the housing cavity 32 of the main housing 14A. Accordingly, the faces of the clamping part 16A translating on and along said internal surfaces of the housing cavity 32A of the main housing 14A correspond to external surfaces of the faces 56A, 58A, 60A, 62A of the clamping part 16A. The translation of the said internal surfaces 24A, 26A, 28A, 30A on said external surfaces 56A, 58A, 60A, 62A is better shown by the cut-view of FIGS. 4A and 4B, in particular by the encircled zone T1.

In another embodiment, to further facilitate the translation of the clamping part 16A with respect to the main housing 14A, the internal surfaces 24A, 26A, 28A, 30A of the housing cavity 32 of the main housing 14A and the external surfaces 56A, 58A, 60A, 62A of the clamping part 16A can be respectively provided with guiding elements, like longitudinal grooves extending along the clamping direction D.

The clamping part 16A is designed so that a first side 64A of the housing 52A, being perpendicular to the faces 56A, 58A, 60A, 62A, is configured for receiving at least one cable. In the exemplary embodiment shown in FIG. 1, the first side 64A of the housing 52A is provided with the two concave recesses 48A, 50A extending along the Y-axis of the Cartesian coordinate system indicated in FIG. 1. The recesses 48A, 50A respectively have a depth extending along the Z-axis. The two recesses 48A, 50A are adapted to the dimension of cables to be clamped between the first side 64A of the housing 52A and an internal surface 19A of the base 18A of the main housing 14A, as better shown in the cut-views of FIGS. 4A and 4B. The clamping part 16A is provided with a second side 66A, substantially opposite to the first side 64A along the clamping direction D.

As the clamping part 16A has a complementary shape to the main housing 14A, in the exemplary embodiment shown in FIG. 1, the housing 52A is also provided with edges e1, e2, e3, e4 (e4 is not visible in FIG. 1) of different lengths, which are respectively proportional to the edges E1, E2, E3, E4 of the main housing 14A. The edge e1 joins the faces 56A and 62A. The edge e2 joins the faces 56A and 58A. The edge e3 joins the faces 58A and 60A. The edge e4 (not visible in the view of FIG. 1) joins the faces 60A and 62A. Consequently, because of the length difference of the edges e1 to e4, the second side 66A is on oblique surface. In other words, the entire second side 66A is not parallel to the first side 64A extending in the plan (XY).

The second side 66A is provided with two concave recesses 68A, 70A. Each concave recesses 68A, 70A has a complementary shape to a cable. The recesses 68A, 70A respectively have a depth extending along the Z-axis.

In the exemplary embodiment shown in FIG. 1, the second side 66A is provided with a circumferential shoulder 72A. The circumferential shoulder 72A contributes to ease the manufacturing process of the clamping part 16A by plastic injection molding. The circumferential shoulder 72A can also provide a stop when said circumferential shoulder 72A abuts against the free borders B1, B1', B2, B2' of the main housing 14A. In a variant, the second side 66A is not provided with a circumferential shoulder.

The clamping part 16A is further configured to accommodate insulation piercing devices 74A, 76A. In the exemplary embodiment shown in FIG. 1, said insulation piercing devices 74A, 76A are substantially flat and are supported in the housing 52A by an interference fit between each insulation piercing device 74A, 76A and a respective receptacle 78A, 80A provided in the housing 52A. Said receptacle 78A, 80A extend inside the housing 52A from the first side 64A to the second side 66A in parallels plans to the plan (XZ). The insulation piercing devices 74A, 76A are inserted and hold in the respective receptacles 78A, 80A.

In a variant, the insulation piercing devices 74A, 76A are supported in the housing 52A by a different connection than by interference fit. For instance, the housing 52A, made of rigid plastic, can be overmolded on the insulation piercing devices 74A, 76A.

The insulation piercing device 74A and the insulation piercing device 76A are arranged in the housing 52A so as to be respectively positioned in plans parallels to each other, both parallel to the plan (XZ).

The insulation piercing device 74A is identical to the insulation piercing device 76A. Hence, for sake of clarity, the description of the insulation piercing device herebelow is only made in reference to insulation piercing device 74A and the same description applies to the insulation piercing device 76A. It is noted that the insulation piercing device 74A (respectively 76A) is symmetrical to the insulation piercing device 74B (respectively 76B) by a mirror symmetry with respect to a plan (XY). Hence, the same description also applies to the insulation piercing device 74A, 76B.

As the insulation piercing devices 74A, 74B, 76A, 76B can be all identical, a standardized manufacturing is possible for low cost. However, the insulation piercing device 74A, 74B, 76A, 76B do not need to be identical. Thus, in further variants, the size and the shape of one more of insulation piercing device could vary depending on the installation requirements.

As shown in FIG. 1, the insulation piercing device 74A is integrally formed in one-piece in a metal or metal alloy material, in particular in copper or tinned-plated copper, i.e. in an electrically conductive material. In the exemplary embodiment shown in FIG. 1, the insulation piercing device 74A comprises four serrated blades 82A, 84A, 86A, 88A. The function of the insulation piercing device 74A, 74B, 76A, 76B is to establish an electrical contact between the cables.

In the exemplary embodiment shown in FIG. 1, the extremities of the serrated blades 82A, 84A, 86A, 88A are provided with tooth extending in a direction parallel to the clamping direction D. The serrated blades 82A, 84A, 86A, 88A of the insulation piercing device 74A are configured for piercing respective insulation layers and contacting respective conductors of cables. In a variant, at least one of the blades 82A, 84A, 86A, 88A has a V-shape instead of a tooth shape. The V-shape must be sharped enough to pierce an insulation layer of a cable. In another variant, the design of the serrated blades 82A, 84A, 86A, 88A is configured for piercing a bare cable.

In the plan (XZ), the geometry of the insulation piercing device 74A is complementary to the geometry of the faces 58A, 62A of the clamping part 16A, said faces 58A, 62A having a complementary shape to the faces 26A, 30A of the main housing 14A. As a result, a free-border B3 joining the serrated blades 82A and 84A is non-parallel to a free-border B4 joining the serrated blades 86A and 88A. In other words, the free-border B3 extends along an oblique direction with respect to the free-border B4. The border B4 extends along a direction parallel to the X-axis.

In reference to the overall cable connector assembly 10 and in view of the above, a first clamping region R1 is formed between the two sub-assemblies 12A, 12B. In the first clamping region R1, at least one cable can be received between the recesses 68A and 68B and clamped by the serrated blades 82A and 82B. In a variant, two cables (instead of one) can be inserted between the recesses 68A and 68B. One cable can be pierced by the serrated blades 82A of the insulation piercing device 74A and the serrated blades 82B of the insulation piercing device 74B. Another cable can be pierced by the serrated blades 82A of the insulation piercing device 76A and the serrated blades 82B of the insulation piercing device 76B.

A further cable can be received in the first clamping region R1 between the recesses 70A and 70B, and clamped by the serrated blades 84A and 84B. In a variant, two cables (instead of one) can be inserted between the recesses 70A and 70B. One cable can be pierced by the serrated blades 84A of the insulation piercing device 74A and the serrated blades 84B of the insulation piercing device 74B. Another cable can be pierced by the serrated blades 84A of the insulation piercing device 76A and the serrated blades 84B of the insulation piercing device 76B. Hence, up to four cables can be clamped and pierced in the first clamping region R1.

As shown in FIG. 1, the face 66A of the clamping part 16A facing the face 66B of the other clamping part 16B in the first clamping region R1 extend within a plan that is non-parallel to the plan in which extends the face 66B of the clamping part 16B.

The asymmetrical design according to the embodiment illustrated in FIG. 1 of the insulation piercing device 74A-B, 76A-B, the clamping parts 16A-B and the main housing 14A-B allows to adapt more easily a difference of diameter between a cable inserted between the recesses 68A and 68B and another cable inserted between the recesses 70A and 70B.

In the exemplary embodiment shown in FIG. 1, the recesses 68A and 68B are configured for receiving a cable having a greater diameter than a cable insertable between the recesses 70A and 70B.

Moreover, two secondary clamping regions R2A and R2B are respectively formed in the housing cavities 32A, 32B between the clamping part 16A, 16B and the main housing 14A, 14B.

In the secondary clamping region R2A, at least one cable can be received inside the housing cavity 32A between an internal surface (not visible in FIG. 1, but see reference 19A in FIGS. 4A and 4B) of the base 18A of the main housing 14A and the recess 48A of the first side 64A of the clamping part 16A. Said cable can be pierced by the serrated blades 88A.

Figure 3:
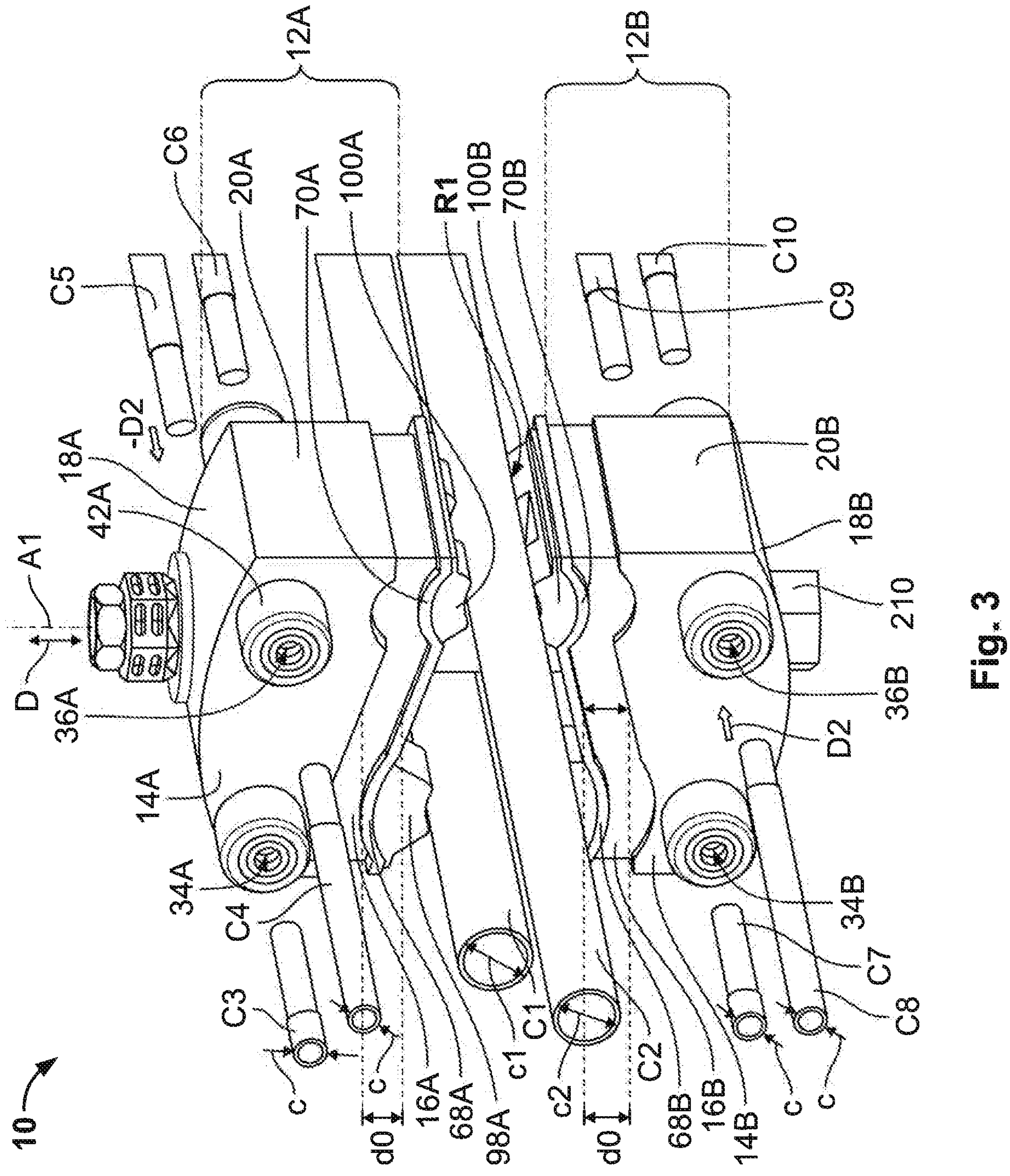
FIG. 3 is a perspective view of the cable connector assembly in the assembled state with a plurality of insulated conductor cables.

It is noted that in a variant, like in the embodiment illustrated in FIG. 3, two cables (instead of one) can be inserted between said internal surface 19A (not visible in FIG. 1) of the base 18A of the main housing 14A and the recess 48A of the first side 64A of the clamping part 16A. One cable can be pierced by the serrated blades 88A of the insulation piercing device 74A and another cable can be pierced by the serrated blades 88A of the insulation piercing device 76A.

A further cable can be received in the secondary clamping regions R2A between said internal surface 19A (not visible in FIG. 1) of the base 18A of the main housing 14A and the recess 50A of the first side 64A of the clamping part 16A. Said further cable can be clamped by the serrated blades 86A.

It is noted that in a variant, like in the embodiment illustrated in FIG. 3, two cables instead of one) can be inserted between said internal surface 19A (not visible in FIG. 1) of the base 18A of the main housing 14A and the recess 50A of the first side 64A of the clamping part 16A. One cable can be pierced by the serrated blades 86A of the insulation piercing device 74A and another cable can be pierced by the serrated blades 86A of the insulation piercing device 76A. Hence, up to four cables can be pierced in the secondary clamping region R2A.

In the secondary clamping region R2B, one cable can be received inside the housing cavity 32B between an internal surface (not visible in FIG. 1, but see reference 19B in FIGS. 4A and 4B) of the base 18B of the main housing 14B and the recess 48B of the first side 64B of the clamping part 16B. Said cable can be clamped by the serrated blades 88A.

It is noted that in a variant, like in the embodiment illustrated in FIG. 3, two cables instead of one) can be inserted between said internal surface 19B (not visible in FIG. 1) of the base 18B of the main housing 14B and the recess 48B of the first side 64B of the clamping part 16B. One cable can be pierced by the serrated blades 88B of the insulation piercing device 74B and another cable can be pierced by the serrated blades 88B of the insulation piercing device 76B.

A further cable can be received in the secondary clamping regions R2B between said internal surface 19B (not visible in FIG. 1) of the base 18B of the main housing 14B and the recess 50B of the first side 64B of the clamping part 16B. Said further cable can be pierced by the serrated blades 86B.

It is noted that in variant, like in the embodiment illustrated in FIG. 3, two cables instead of one) can be inserted between said internal surface 19B (not visible in FIG. 1) of the base 18B of the main housing 14B and the recess 50B of the first side 64B of the clamping part 16B. One cable can be pierced by the serrated blades 86B of the insulation piercing device 74B and another cable can be pierced by the serrated blades 86B of the insulation piercing device 76B. Hence, up to four cables can be pierced in the secondary clamping region R2B.

The structure of the cable connector assembly 10 according to the present invention is thus configured for piercing up to twelve cables, in particular up to four cable in each clamping region R1, R2A, R2B.

In the exemplary embodiment shown in FIG. 1, the cable connector assembly 10 further comprises sealing devices 90A, 90B, 92A, 92B. Each of the sealing devices 90A, 90B, 92A, 92B may integrally formed in an elastomer material, like rubber. The sealing devices 90A, 90B, 92A, 92B can be overmolded on the respective insulation piercing device 74A-B, 76A-B and housings 52A-52B.

Each sealing device 90A, 90B is provided at the second side 66A, 66B of the respective clamping part 16A, 16B for sealing an interface between the first clamping region R1 and the respective clamping part 16A, 16B. Each sealing device 90A, 90B comprises a portion 94A, 94B adapted to be tightly inserted in the respective housing 52A, 52B of the clamping part 16A, 16B. Each sealing device 90A, 90B also comprises a shoulder 96A, 96B to further improve the sealing properties.

Each sealing device 90A, 90B comprises protuberances 98A, 98B through which extend the serrated blades 82A, 82B. Each sealing devices 90A, 90B further comprises protuberances 100A, 100B through which extend the serrated blades 84A, 84B. The protuberances 98A, 98B, 100A, 100B extended substantially in a perpendicular direction, parallel to the clamping direction D, from the portion 94A, 94B. An insertion of the 98A, 98B, 100A, 100B inside the respective housing 52A, 52B of the clamping part 16A, 16B is prevented by the dimensions of said protuberances and the shoulders 96A, 96B.

The border B5 of the sealing devices 90A, 90B joining respectively the protuberance 98A, 98B to the protuberance 100A, 100B does not extend parallel to the X-axis because of the asymmetrical geometry of the clamping parts 16A, 16B in the exemplary embodiment shown in FIG. 1.

The sealing device 92A is provided inside the housing cavity 32A of the main housing 14A for sealing the first face 64A of the clamping part 16A at an interface with the secondary clamping region R2A. Respectively, the sealing device 92B is provided inside the housing cavity 32B of the main housing 14B for sealing the first face 64B of the clamping part 16B at an interface with the secondary clamping region R2B.

Each sealing device 92A, 92B is provided with concave recesses 102A, 102B, 104A, 104B for receiving one or two cables each. The concave recesses 102A, 102B allow sealing an interface with the concave recesses 48A, 48B of the clamping part 16A, 16B. The concave recesses 104A, 104B allow sealing an interface with the concave recesses 50A, 50B clamping part 16A, 16B. The shape and dimensions of the concave recesses 102A, 102B, 104A, 104B of the sealing devices 92A, 92B are thus adapted to the dimensions of the clamping parts 16A, 16B and cables to be inserted therein.

The serrated blades 86A extend through the concave recesses 104A of the sealing device 92A for piercing a cable at the secondary clamping region R2A. Respectively, the serrated blades 86B extend through the concave recesses 104B of the sealing devices 92B for piercing a cable at the secondary clamping region R2B.

The serrated blades 88A extend through the concave recesses 102A of the sealing device 92A for piercing a cable at the secondary clamping region R2A. Respectively, the serrated blades 88B extend through the concave recesses 102B of the sealing devices 92B for piercing a cable at the secondary clamping region R2B.

In order to keep cables clamped in the clamping regions R1, R2A, R2B, the cable connector assembly 10 comprises tightening device 200. The tightening device 200 allows tightening the two sub-assemblies 12A, 12B. The tightening of the two sub-assemblies 12A, 12B is achieved by their mutual translation, the sub-assemblies 12A, 12B moving towards each other along the clamping direction D.

In the embodiment illustrated in FIG. 1, the tightening device 200 comprise a screw 202 of longitudinal axis A1 inserted through the two sub-assemblies 12A, 12B, where a bolt 204 can be used for the tightening. As shown in FIG. 1, the screw 202 can be inserted essentially along a central vertical axis of the cable connector assembly 10. Hence, the screw 202 extends along the clamping direction D through the main housing 14A, the sealing device 92A, the clamping part 16A, the sealing device 90A, the sealing device 90B, the clamping part 16B, the sealing device 92B and the main housing 14B.

As further illustrated in FIG. 1, a spacer 206 can also be used between a head 208 of the screw 202 and the base 18A of the main housing 14A. The screw 202 further comprises a bolt 210 positioned so as to abut on the main housing 14B.

The main housings 14A, 14B and the clamping parts 16A, 16B are all arranged between the head 208 and the bolt 210 along the central axis A1 of the screw 202.

It is possible that, once the cable connector assembly 10 is assembled, like in FIG. 2, an end part of the screw 202 is deliberately damaged so that the cable connector assembly 10 can no longer be disassembled. Furthermore, it is also possible to use a shear-head bolt, such that the operator will stop tightening the bolt once its shear-head breaks.

As further illustrated, in FIG. 1, the cable connector assembly 10 comprises anti-rotation devices 300A, 300B for preventing a rotation of each clamping part 16A, 16B with respect to a rotation axis aligned with the longitudinal axis A1 of the screw 202 and parallel to the clamping direction D.

The anti-rotation device 300A of the clamping part 16A is formed by a non-circular duct 302A, in particular a square duct 302A, for receiving the screw 202 therein. The non-circular duct 302A extends along the clamping direction D from the first face 64A towards the second face 66A and protrudes beyond to the second face 66A along a length L4, as shown in FIG. 1.

The anti-rotation device 300B of the clamping part 16B is also formed by a non-circular duct 302B, in particular a square duct 302B, for receiving the screw 202 therein. The non-circular duct 302B extends along the clamping direction D from the first face 64B towards the second face 66B and protrudes beyond to the second face 66B along a length L5, as shown in FIG. 1. The internal circumference of the non-circular duct 302B is dimensioned according to the diameter of the screw 202 for receiving the screw 202.

The respective internal circumferences (not visible) of the non-circular ducts 302A, 302B are dimensioned in a complementary manner so that the non-circular ducts 302B of length L5 can be received and translate within the non-circular ducts 302B of length L4 along the clamping direction D. The length L5 is greater than the length L4.

The respective non-circular cross-section of the ducts 302A, 302B in a plan perpendicular to the longitudinal axis A1 of the screw 202 allows preventing a rotation of the clamping parts 16A, 16B in a plan (XY) with respect to a rotation axis aligned with the longitudinal axis A1 of the screw 202 by interference-fit, also known as friction-fit.

Furthermore, the main housing 14B is provided at the base 18B with a recess for receiving the bolt 210, such that a form-fit connection of said bolt 210 in the recess of the main housing 14B prevents a rotation of said main housing 14B with respect to the central axis A1 of the screw 200.

The anti-rotation devices 300A, 300B provide the advantage that the installer is able to tighten the tightening device 200, for instance a screw and a bolt, without worrying about manually keeping the sub-assemblies 12A,12B from rotation relatively to a central axis of the screw 202. It thus allows improving the ease of installation of the cable connector assembly 10.

FIG. 2 illustrates the cable connector assembly 10 of FIG. 1 in an assembled state and without any insulated conductor cables, i.e. before the tightening operations have taken place.

In the assembled state, as shown in FIG. 2, each clamping part 16A, 16B is partially inserted into the respective main housing 14A, 14B. Each clamping part 16A, 16B protrudes beyond the free borders B1, B1', B2, B2' (only B1 and B2 are visible in the FIG. 2) of the main housing 14A, 14B along a distance d0 in the assembled state and before the tightening operations. The distance d0 is smaller than the length of any of the edges e1, e2, e3, e4, as each clamping part 16A, 16B is partially inserted into the respective main housing 14A, 14B.

Figure 4B:
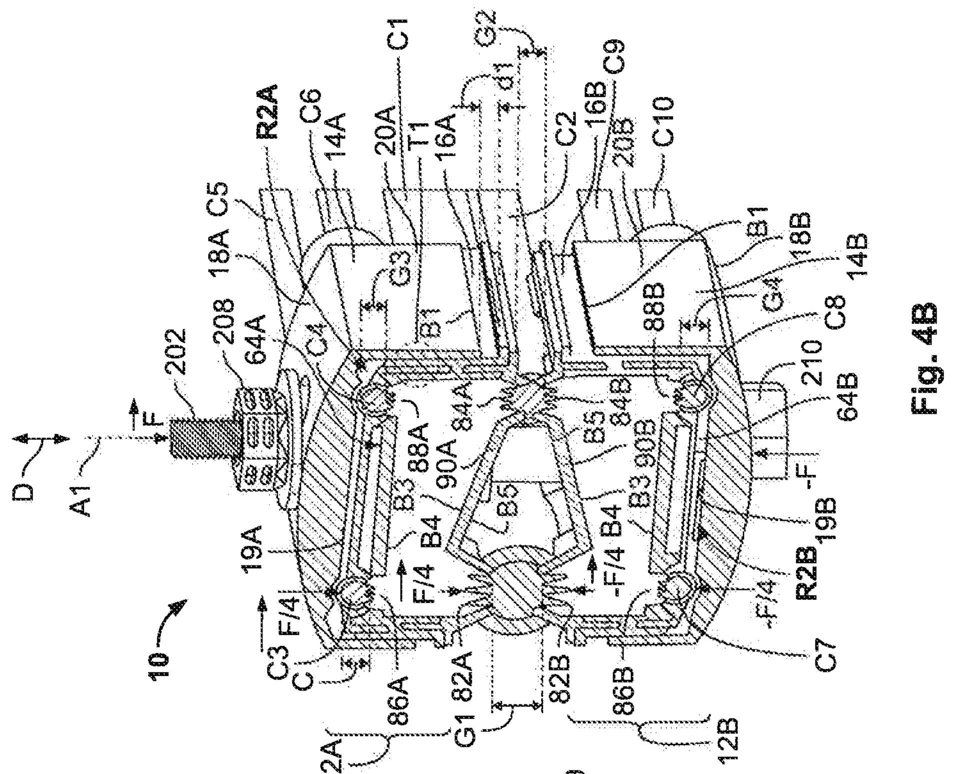
FIG. 4B is a sectional perspective view of the cable connector assembly of FIG. 3, after a tightening operation.

The installation process of the cable connector assembly 10 is described thereafter with reference to FIGS. 3 to 4B. Elements with the same reference numeral already described and illustrated in FIGS. 1 and 2 will not be described in detail again but reference is made to their description above.

At the step shown in FIG. 3, a main cable C1, for instance a trunk cable C1, of diameter c1 is installed in the first clamping region R1 between the recesses 68A, 68B. In a variant, two main cables, like two trunk cables, can be installed between the recesses 68A, 68B in the first clamping region R1 along parallel directions to one another.

A tap cable C2 of diameter c2, wherein c2 is less than c1, is installed in the first clamping region R1 between the recesses 70A, 70B. In a variant, two tap cables can be installed between the recesses 70A, 70B in the first clamping region R1 along parallel directions to one another.

In another embodiment, wherein only a trunk cable and no tap cable is required in the first clamping region R1, a dummy cable can be inserted between the recesses 70A, 70B so as to provide a sufficiently good force (i.e. strain) transmission in the cable connector assembly 10. As a variant, instead of using a dummy cable, the opposite blades 84A, 84B can have a complementary geometry providing a form-fit connection directly between said opposite blades 84A, 84B. As a result, there is no need to insert a dummy cable between the opposite blades 84A, 84B, and the diameter of the “missing” tap cable can be compensated by the dimensions of the blades 84A, 84B forming a form-fit connection.

A tap cable C3 of diameter c, wherein c is less than c1, is inserted along an insertion direction D2 in the cavity housing 32A via the through-hole 34A. It is noted that the diameter c can be different from the diameter c2. The diameters c, c1 and c2 take in account any insulation layer of the cables.

A tap cable C4 of diameter c is inserted along the insertion direction D2 in the cavity housing 32A via the through-hole 36A.

A tap cable C5 of diameter c is inserted along an insertion direction −D2, parallel but opposite to the insertion direction D2, in the cavity housing 32A via the through-hole 38A.

A tap cable C6 of diameter c is inserted along the insertion direction −D2 in the cavity housing 32A via the through-hole 40A.

A tap cable C7 of diameter c is inserted along the insertion direction D2 in the cavity housing 32B of the main housing 14B via the through-hole 34B.

A tap cable C8 of diameter c is inserted along the insertion direction D2 in the cavity housing 32B via the through-hole 36B.

A tap cable C9 of diameter c is inserted along the insertion direction −D2 in the cavity housing 32B via the through-hole 38B.

A tap cable C10 of diameter c is inserted along the insertion direction −D2 in the cavity housing 32B via the through-hole 40B.

The parallel insertion directions D2, −D2 are perpendicular to the clamping direction D. In the cable connector assembly 10, the main cable C1 and tap cable C2 extend longitudinally along an insertion directions D2, −D2.

In a variant, one or more of the tap cables C3 to C10 has/have a diameter different than the diameter c.

Figure 4A:
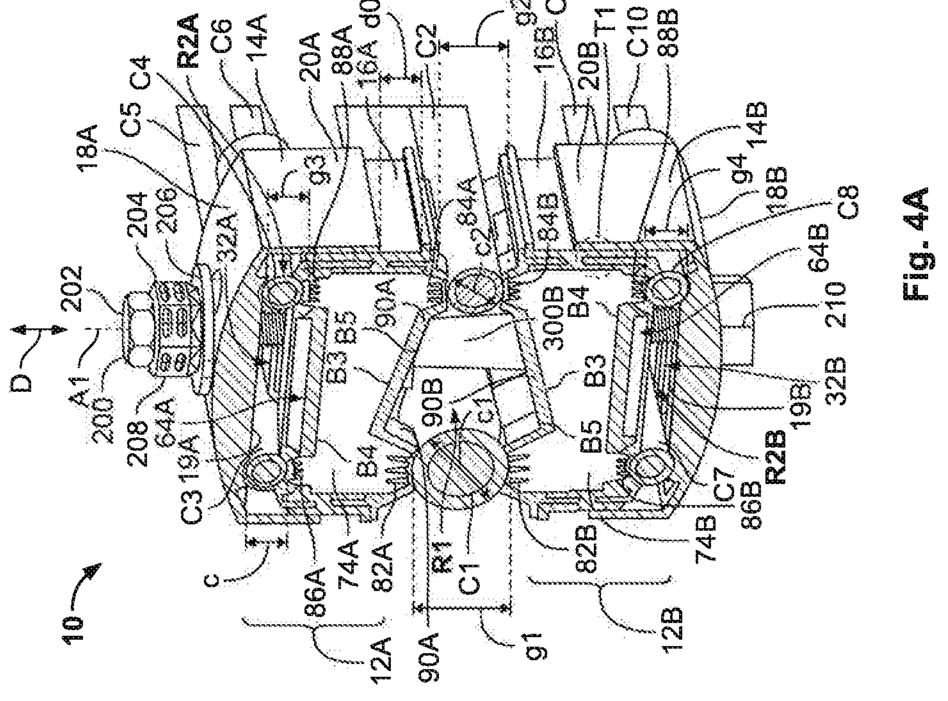
FIG. 4A is a sectional perspective view of the cable connector assembly of FIG. 3, before a tightening operation.

FIG. 4A shows a step following the step shown in FIG. 3. At the step of FIG. 4A, the cables C1 to C10 have been inserted into the cable connector assembly 10.

As shown in FIG. 4A, the main cable C1 (e.g. the trunk cable C1) is placed in the first clamping region R1 between the serrated blades 82A, 82B. At the step of FIG. 4A, before the tightening step (shown in FIG. 4B), the serrated blades 82A, 82B are distanced from each other along the clamping direction D by a gap g.

The tap cable C2 is placed in the first clamping region R1 between the serrated blades 84A, 84B. At the step of FIG. 4A, before the tightening step (shown in FIG. 4B), the serrated blades 84A, 84B are distanced from each other along the clamping direction D by a gap g2, wherein g2 is less than g1, as the cable C2 has a smaller diameter c2 than the diameter c1 of the main cable C1.

The tap cable C3 is placed in the secondary clamping region R2A between the serrated blades 86A of the insulation piercing device 74A and an internal surface 19A of the base 18A. The internal surface 19A is oriented towards the inside of the housing cavity 32A as shown in FIG. 4A. The internal surface 19A of the base 18A corresponds to a bottom of the housing cavity 32A.

The tap cable C4 is placed in the secondary clamping region R2A between the serrated blades 88A of the insulation piercing device 74A and the internal surface 19A of the base 18A.

The tap cable C5 is placed in the secondary clamping region R2A between the serrated blades 86A of the insulation piercing device 76A and the internal surface 19A of the base 18A.

The tap cable C6 is placed in the secondary clamping region R2A between the serrated blades 88A of the insulation piercing device 76A and the internal surface 19A of the base 18A.

At the step of FIG. 4A, before the tightening step (shown in FIG. 4B), the serrated blades 86A, 88A are distanced from the internal surface 19A of the base 18A along the clamping direction D by a gap g3.

Respectively, the tap cable C7 is placed in the secondary clamping region R2B between the serrated blades 86B of the insulation piercing device 74B and an internal surface 19B of the base 18B. The internal surface 19B is oriented towards the inside of the housing cavity 32B as shown in FIG. 4A. The internal surface 19B of the base 18B corresponds to a bottom of the housing cavity 32B.

The tap cable C8 is placed in the secondary clamping region R2B between the serrated blades 88B of the insulation piercing device 74B and the internal surface 19B of the base 18B.

The tap cable C9 is placed in the secondary clamping region R2B between the serrated blades 86B of the insulation piercing device 76B and the internal surface 19B of the base 18B.

The tap cable C10 is placed in the secondary clamping region R2B between the serrated blades 88B of the insulation piercing device 76B and the internal surface 19B of the base 18B.

At the step of FIG. 4A, before the tightening step (shown in FIG. 4B), the serrated blades 86B, 88B are distanced from the internal surface 19B of the base 18B along the clamping direction D by a gap g4.

As can be seen from the embodiment represented by the cut-views of FIGS. 4A and 4B, the internal surface 19B is provided with grooves for receiving the cables C3 to C10.

In a variant (not represented), a wedge can be provided between said groove and one of the cables C3 to C10 to better cope with a difference in cable diameter in the cable connector assembly 10.

Once all cables C1 to C10 have been inserted into the cable connector assembly 10, the tightening device is tightened by an operator. A rotation of the head 208 and the bolt 210 relative to the screw 202 causes a mutual translation movement of the sub-assemblies 12A, 12B towards each other along the clamping direction D. Moreover, each of the two sub-assemblies 12A, 12B is pivotable relative to the longitudinal axis A1 of the screw 202. The pivot motion is facilitated by the combination of the oblong shape of the through holes 22A, 22B and the convex surfaces of the bases 18A, 18B. As a result of the tightening operation, the cable connector assembly 10 is in an assembled and connected state. In the assembled and connected state, an electrical contact is established between the main cable C1 and the tap cables C2 to C10.

The assembled and connected state is represented by the FIG. 4B.

During the tightening operation, at the upper part of the cable connector assembly 10 shown in FIG. 4B, the head 208, in particular the shear head 208, generates a force F on the main housing 14A. The main housing 14A, in particular the internal surface 19B, compresses the tap cables C3, C4, C5, C6 on the serrated blades 86A, 88A in the secondary clamping region R2A with a force F/4. This force F/4 pushes the serrated blades 82A, 84A into the main cable C1 and the tap cable C2.

As a result, after tightening, the serrated blades 86A, 88A are distanced from the internal surface 19A of the base 18A along the clamping direction D by a gap G3, wherein G3 is less than g3.

At the bottom part of the cable connector assembly 10, the bolt 210 returns the force –F to the main housing 14B, in particular the internal surface 19B, which compresses the tap cables C7, C8, C9, C10 on the serrated blades 86B, 88B in the secondary clamping region R2B with a force –F/4. This force –F/4 pushes the serrated blades 82B, 84B into the main cable C1 and the tap cable C2.

The forces F, —F, F/4 and –F/4 are parallel to the clamping direction D.

After the tightening operation, the serrated blades 86B, 88B are distanced from the internal surface 19B of the base 18B along the clamping direction D by a gap G4, wherein G4 is less than g4.

At the first clamping region R1, the serrated blades 82A, 82B are distanced from each other along the clamping direction D by a gap G1, wherein G1 is less than 1. Respectively, the serrated blades 84A, 84B are distanced from each other along the clamping direction D by a gap G2, wherein G2 is less than g2.

Hence, in the assembled and connected state is represented by the FIG. 4B, the tightening of the cable connector assembly 10 along the clamping direction D has the effect of reducing the initial gaps g1, g2, g3, g4 between the serrated blades at the region R1 and between the serrated blades and the main housing 14 at the regions R2A, R2B to respective smaller distance G1, G2, G3, G4. It leads to the perforation of the insulating layer of the cables C1-C10 by the serrated blades B2, 84, 86, 88 which allows causing a contact between the teeth of the serrated blades 82, 84, 86, 88 with the conductor core of the cables C1-C10. Hence, an electrical contact between the cables C1-C10, i.e. their conductor cores, and the serrated blades 82, 84, 86, 88 can be established in the assembled and connected state of FIG. 4B by the translation of the sub-assemblies 12A, 12B towards each other along the clamping direction D.

As shown in FIG. 4B, in the assembled and connected state, each clamping part 16A, 16B protrudes beyond the free borders B1, B1', B2, B2' (only B1 is visible in the FIG. 4A) of the main housing 14A, 14B along a distance d1, wherein d1 is less than d0.

To better deal with cables of different diameters, the first clamping region R1 can be rendered asymmetric for receiving two cables of different diameters, in particular by providing an oblique face to the clamping parts 16A, 16B. The FIG. 4B highlights that the non-parallel borders B3, B4 allows better dealing with the differences of diameters between the main cable C1 and the tap cable C2.

The cable connector assembly 10 is configured to clamp up to twelve cables and to cope with cables of different diameters by the two translatable and pivotable sub-assemblies 12A, 12B, and translatable clamping parts 16A, 16B into their respective main housings 14A, 14B.

The present invention is, however, not limited to the above-mentioned asymmetric embodiment. Hence, in a variant, the borders B3, B4 can respectively extend between the blades 82, 84 and the blades 86, 88 along parallel directions to each other.

The clamping parts 16A, 16B are used for the clamping taking place in all clamping regions R1, R2A, R2B.

The sealing devices 42A, 42B, 90A, 90B, 92A, 92B allow providing a cable connector assembly 10 adapted for watertight application.

The present invention is however not limited to the above-mentioned watertight embodiment.

The cable connector assembly 10 for electrically connecting cables allowing the connection of one main trunk cable C1 to a plurality of tap cables C2-C10 having a respective different diameter than the main trunk cable, in particular by one cable connector assembly wherein only one tightening device 200 needs to be operated for the installation.

All previously discussed embodiments are not intended as limitations but serve as examples illustrating features and advantages of the invention. It is to be understood that some or all of the above described features can also be combined in different ways.

What is claimed is:

1. A cable connector assembly, comprising:

a pair of sub-assemblies including a first sub-assembly and a second sub-assembly movable in translation relative to each other along a clamping direction, each of the sub-assemblies is rotatable relative to a pivot axis extending perpendicular to the clamping direction, each of the sub-assemblies has a main housing and a clamping part at least partially housed within the main housing, each main housing has a housing cavity defined by a base and from which extends a circumferential wall along the clamping direction, the clamping part is movable in translation relative to the main housing along the clamping direction; and a tightening device tightening the sub-assemblies along the clamping direction with a first clamping region formed between the sub-assemblies that receives and clamps a first cable, a secondary clamping region is formed in each of the sub-assemblies between the clamping part and the main housing that receives and clamps a secondary cable, the circumferential wall has a pair of opposite faces each having a through hole receiving the secondary cable at the secondary clamping region.

2. The cable connector assembly of claim 1, wherein the secondary clamping region is formed between the clamping part and the base of the main housing.

3. The cable connector assembly of claim 1, further comprising a sealing device provided at each of the through holes of the circumferential wall, the sealing device sealing an interface between the housing cavity and the secondary cable.

4. The cable connector assembly of claim 1, wherein the clamping part has a housing integrally formed in an electrically insulating material and delimited by a circumferential wall extending along the clamping direction.

5. The cable connector assembly of claim 4, wherein the circumferential wall has an external surface sliding along an internal surface of the main housing by a plurality of complementary guiding elements disposed on the external surface and the internal surface.

6. The cable connector assembly of claim 4, wherein the clamping part has an insulation piercing device supported in the housing, the insulation piercing device pierces an insulation layer and contacts a conductor of the first cable and the secondary cable.

7. The cable connector assembly of claim 6, wherein the insulation piercing device is integrally formed in one piece and has a serrated blade with a plurality of teeth extending in a direction parallel to the clamping direction.

8. The cable connector assembly of claim 7, wherein the serrated blade extends through a sealing device on the clamping part of each of the sub-assemblies.

9. The cable connector assembly of claim 1, further comprising a sealing device on the clamping part of each of the sub-assemblies that seals an interface between the first clamping region and the clamping part and an interface between the secondary clamping region and the clamping part.

10. The cable connector assembly of claim 1, wherein a first face of the clamping part of the first sub-assembly faces a second face of the clamping part of the second sub-assembly at the first clamping region, the first face and the second face extend non-parallel to each other.

11. The cable connector assembly of claim 1, wherein the first clamping region and/or each of the secondary clamping regions receives up to two cables along an insertion direction perpendicular to the clamping direction and up to two cables along a parallel and opposite direction to the insertion direction.

12. The cable connector assembly of claim 1, wherein the tightening device has a head, a bolt, and a screw longitudinally extending along a central axis of the cable connector assembly, the central axis is parallel to the clamping direction.

13. The cable connector assembly of claim 12, wherein each of the main housings and the clamping parts are arranged between the head and bolt along the central axis of the screw.

14. The cable connector assembly of claim 13, wherein each of the clamping parts has a housing with an anti-rotation device preventing a rotation around the central axis of the screw, the housings of the clamping parts have complementary non-circular ducts translating one into the other and dimensioned to receive the screw and prevent rotation by interference fit.

15. The cable connector assembly of claim 12, wherein at least one of the main housings has a recess receiving the bolt, a form-fit connection of the bolt in the recess prevents a rotation of the main housing with respect to the central axis of the screw.

16. The cable connector assembly of claim 1, wherein each of the main housings and each of the clamping parts are individual pieces that are integrally formed in an electrically insulating material.

17. The cable connector assembly of claim 1, wherein the cable connector assembly electrically connects the first cable to the secondary cables in each of the sub-assemblies, the first cable having a greater diameter than the secondary cables.

18. A cable connector assembly, comprising:

a pair of sub-assemblies including a first sub-assembly and a second sub-assembly movable in translation relative to each other along a clamping direction, each of the sub-assemblies is rotatable relative to a pivot axis extending perpendicular to the clamping direction, each of the sub-assemblies has a main housing and a clamping part at least partially housed within the main housing, the clamping part is movable in translation relative to the main housing along the clamping direction; and a tightening device having a screw longitudinally extending along a central axis of the cable connector assembly and tightening the sub-assemblies along the clamping direction with a first clamping region formed between the sub-assemblies that receives and clamps a first cable, a secondary clamping region is formed in each of the sub-assemblies between the clamping part and the main housing that receives and clamps a secondary cable, each of the clamping parts has a housing with an anti-rotation device preventing a rotation around a central axis of the screw, the housings of the clamping parts have complementary non-circular ducts translating one into the other and dimensioned to receive the screw and prevent rotation by interference fit.

* * * * *